US006178400B1

(12) United States Patent
Eslambolchi

(10) Patent No.: US 6,178,400 B1
(45) Date of Patent: Jan. 23, 2001

(54) METHOD AND APPARATUS FOR NORMALIZING SPEECH TO FACILITATE A TELEPHONE CALL

(75) Inventor: Hossein Eslambolchi, Basking Ridge, NJ (US)

(73) Assignee: AT&T Corp., New York, NY (US)

( * ) Notice: Under 35 U.S.C. 154(b), the term of this patent shall be extended for 0 days.

(21) Appl. No.: 09/120,411

(22) Filed: Jul. 22, 1998

(51) Int. Cl.[7] .......... G10L 15/00
(52) U.S. Cl. .......... 704/234; 704/224
(58) Field of Search .......... 704/234, 224, 704/248; 379/220, 230

(56) References Cited

U.S. PATENT DOCUMENTS

| | | | |
|---|---|---|---|
| 4,817,158 | 3/1989 | Picheny . | |
| 5,025,471 | 6/1991 | Scott et al. . | |
| 5,375,164 | 12/1994 | Jennings | 379/88 |
| 5,644,632 * | 7/1997 | Ardon | 379/220 |
| 5,696,878 | 12/1997 | Ono et al. . | |
| 5,724,416 | 3/1998 | Foladare et al. . | |
| 5,828,746 * | 10/1998 | Ardon | 379/230 |
| 5,839,103 * | 11/1998 | Mammone et al. | 704/232 |

* cited by examiner

*Primary Examiner*—David R. Hudspeth
*Assistant Examiner*—Susan Wieland

(57) ABSTRACT

Either or both the calling and called parties to a telephone call carried by a telecommunications network may invoke normalization of their speech to enhance intelligibility. In response to such a request, a speech normalization platform determines the manner in which the speech should be normalized. The platform does so by selecting from among a set of rules that specify the manner in which the speech should be modified, the rule that most closely corresponds with a set of parameters indicative of the party's speech. Having selected the rule, the platform then implements the rule to modify the party's speech to enhance its intelligibility.

14 Claims, 1 Drawing Sheet

METHOD AND APPARATUS FOR NORMALIZING SPEECH TO FACILITATE A TELEPHONE CALL

TECHNICAL FIELD

This invention relates to a technique for processing the speech of one or more parties to a telephone call carried by a telecommunications network to enhance the intelligibility of each party's speech.

BACKGROUND ART

Present day providers of voice telephony service, such as AT&T, handle both domestic, as well as international calls. In most, but not all instances, a party to a telephone call uses the language of the country of origin of the call when speaking with another party, especially when both parties reside in the same country. Thus, for example, the parties to a call within the United States generally speak in English. In some instances, the national language of the country of origin of the call may not necessarily be the native language of one or more parties to that call. Immigrants to the United States from non-English speaking countries, even when they become proficient in English, often speak with an accent. While this is neither bad nor uncommon, a party to a call may encounter difficulties in attempting to understand a non-native language speaker, especially if that party speaks with a heavy accent.

A non-native language party to a call could avoid the difficulty of comprehension by choosing to speak his or her native language and employ a translation service, such as AT&T Language Line, to translate the speech into a language comprehensible by the other party or parties to the call. Such language translation services, which effective, are nonetheless costly to use on a regular basis. Moreover, for most non-native language speakers, communicating with others in the national language of the country of origin of the call becomes a matter of pride and perception by others on the call.

Thus, there is a need for a technique for normalizing the speech of one or more parties to a telephone call to improve intelligibility.

BRIEF SUMMARY OF THE INVENTION

Briefly, the present invention provides a method for normalizing the speech of at least one of the parties to a telephone call carried by a telecommunications network to enhance the intelligibility of that party's speech. The method of the invention commences upon at least one party to the call invoking a speech normalization service offered by the network for that party. The requesting party may invoke the speech normalization service by manually signaling the network, such as by entering a prescribed sequence of Dual-Tone Multi-Frequency (DTMF) signals. Alternatively, the network itself could invoke the service in response to receipt of a call originating from, or a call dialed to, a subscriber pre-subscribed to the speech normalization service.

Once a party has invoked the speech normalization service, the network then determines the manner in which the speech of the party invoking the service should be normalized. Upon initially subscribing to the speech normalization service, a subscriber "trains" the network by providing a specimen of the subscriber's speech. The network samples the subscriber's speech specimen to establish various parameters of the subscriber's speech, such as pitch, tone, cadence, frequency and amplitude, to name a few. From such parameters, the network selects the appropriate speech normalization program that instructs the network how to normalize the subscriber's speech to maximize intelligibility. For example, based on a subscriber's particular speech parameters, the normalization program may instruct the network to alter the one or more aspects of the subscriber's speech, such as the tone and/or pitch. Once trained, the network can then automatically invoke the program corresponding to a particular subscriber for a call originated by, or dialed to that subscriber and normalize the subscriber's speech.

A Caller and/or called party not pre-subscribed to the speech normalization service, but who invokes the service on a per-call basis, also trains the network by providing a speech specimen. From that specimen, the network ascertains the party's speech parameters in order to determine the appropriate program by which the network will alter one or more aspects of the party's speech to enhance intelligibility. A party who manually invokes the speech normalization program on a call-by-call basis must train the network each time. Alternatively, the network could store the speech parameters for a Non-service subscriber for a short period of time. Thus, should a non-subscriber seek to invoke the speech normalization service again within that time, the non-subscriber would not need to re-train the network.

DETAILED DESCRIPTION

Figure 1:
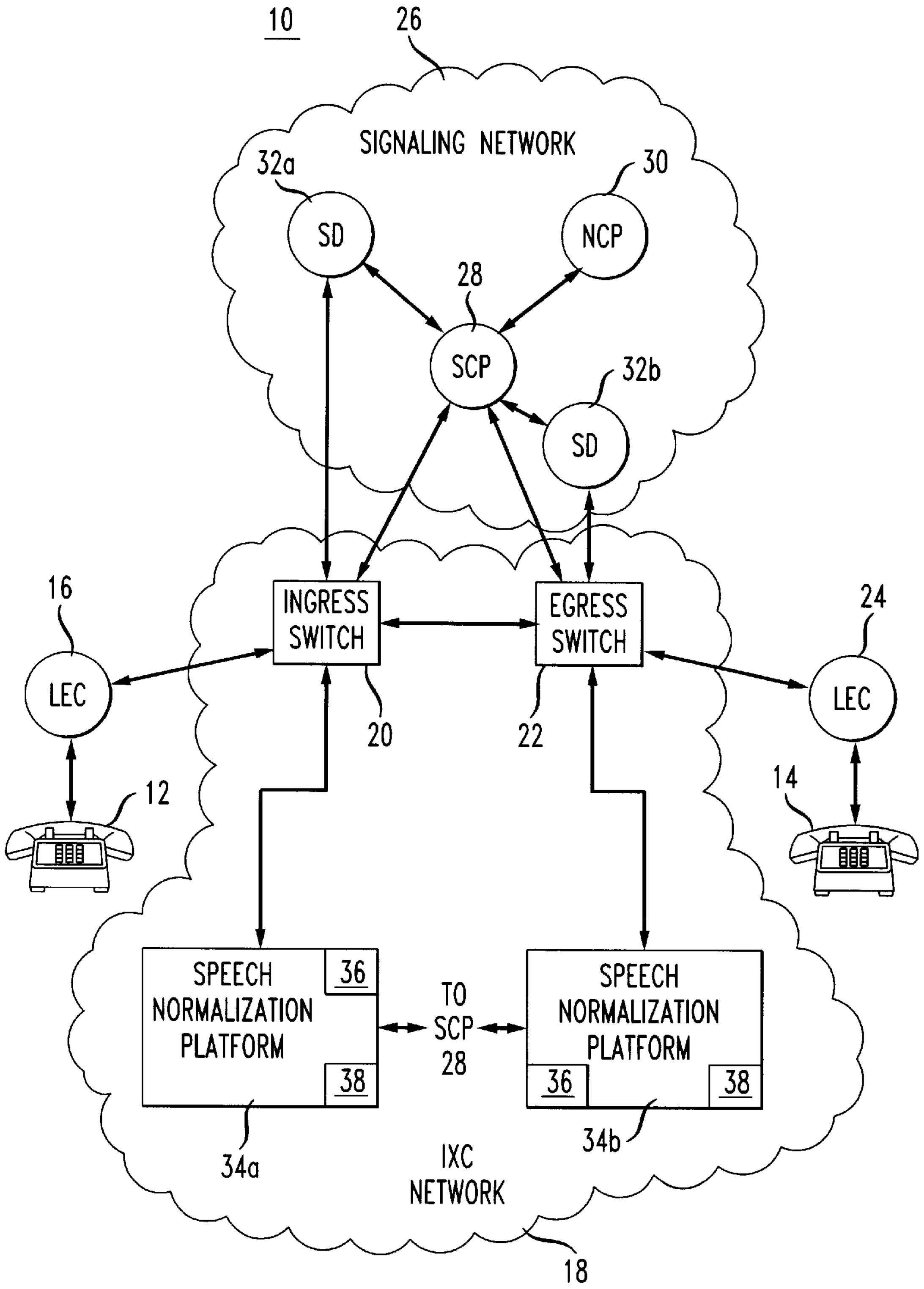
FIG. 1 illustrates a block schematic diagram of a telecommunications network in accordance with a preferred embodiment of the invention for normalizing the speech of one or more parties to a telephone call.

FIG. 1 illustrates a telecommunications network 10 in accordance with a preferred embodiment of the invention for normalizing the speech of one or more parties, represented by station sets 12 and 14, respectively, to a telephone call carried by the network. In the illustrated embodiment, a call initiated by the calling party 12 to the called party 14 passes to a first Local Exchange Carrier (LEC) 16 that provides the calling party with local service (i.e., dial tone). Assuming that the call requires inter-exchange routing, the LEC 16 routes the call to an Inter-Exchange Carrier network 18, such as the IXC network maintained by AT&T, for receipt at an Ingress toll switch 20 in the IXC network. The ingress switch 20 typically comprises a toll switch, such as a 4ESS® switch manufactured by Lucent Technologies. The ingress switch 20 routes the call to an egress toll switch 22, either directly, or through one or more intermediate or via switches (not shown) for receipt at a second local exchange carrier 24 serving the called party 14.

The IXC network 18 typically includes a signaling network 26, such as the SS7 network maintained by AT&T. The signaling network 26 communicates out-of-band signaling messages between and among the switches, such as switches 20 and 22, within the IXC network, as well as the LECS 16 and 24 to facilitate handling of the call. In the illustrated embodiment, the signaling network 26 includes at least one Service Control Point (SCP) 28. The SCP 28 acts as a hub to route signaling messages to and from one or more of the switches 20 and 22 as well as at least one Network Control Points (NCP) 30 that serves as a database to provide the switches with information on call processing. Additionally, the signaling network 26 includes one or more databases, in the form of segmentation directories 32_a_ and 32_b_. The segmentation directories 32_a_ and 32_b_ typically store telephone numbers of subscribers, as well as an indication for each telephone number whether the subscriber associated with that number subscribes to a special service, such as speech normalization in accordance with the invention. The illustrated embodiment of FIG. 1 depicts each of switches 20 and 22 as exclusively coupled to segmentation directories 32_a_ and 32_b_, respectively. However, several switches could share a single segmentation directory.

To provide normalization of the speech in accordance with the invention, the IXC network 18 includes at least one, and preferably, a plurality of speech normalization platforms, such as platforms 34_a_ and 34_b_ illustrated in FIG. 1 coupled to switches 20 and 22, respectively. Ideally, each ingress and egress switch should have its own speech recognition platform, although several switches could share a single platform. Each of the speech normalization platforms 34_a_ and 34_b_ include a processor 36, in the form of a computer, and a memory 38. As will discussed below, the processor 36 possesses the capability of performing sampling and modifying subscribers' speech, while the memory 38 stores separate programs for instructing the processor in the manner in which such speech should be modified.

The IXC network 18 operates to normalize subscribers' speech in the following manner. Upon receipt of a call at the ingress switch 40 from the calling party 12 (as relayed via LEC 16), the ingress switch determines whether the caller has invoked speech normalization. The caller 12 may invoke speech normalization manually, by entering a prescribed sequence of DTMF signals, whereupon the ingress switch 20 launches a request to the speech normalization platform 34_a_. At the same time, the ingress switch 20, or the speech normalization platform 34_a_ may send appropriate information to a billing platform (not shown) to record billing information to bill the called party for the service.

In response to a request for speech normalization, the speech normalization platform 34_a_ prompts the calling party 12 to provide a speech specimen. The processor 36 samples and digitizes the speech sample to ascertain various parameters associated with the caller's speech, such as pitch, tone, cadence, frequency and amplitude, for example. The processor 36 then matches the parameters against those associated with different rules stored in the memory 38 to find the rule most closely associated with the parameters of the caller's speech. Each rule in the memory 38 instructs the processor 36 how to process the incoming speech to maximize intelligibility. In this way, the party can "train" the network to normalize his/her speech.

In practice, the rules are developed empirically by taking actual speech samples, and then making modifications to the speech to maximize intelligibility. The modifications are then correlated to the parameters of the incoming speech to determine for a given of parameters the modifications that achieve maximum intelligibility, thereby creating the rule for such a set of parameters. Ultimately, by taking enough speech specimens and by making various modifications, rules can be developed for a wide variety of different types of speech, and in particular, different types of accents. Neural network technology could be employed to develop and refine the rules stored in the memory 38.

The called party 14 can also manually invoke speech normalization in place or, or in addition to, the calling party 12. Upon receipt of a call from the calling party 12, the calling party 14 can invoke speech normalization by entering the prescribed sequence of DTMF signals. In response to the prescribed sequence of DTMF signals, the Egress switch 22 launches a request to the speech normalization platform 34_b_ which then normalizes the speech of the called party 14 in the same manner that the speech normalization platform 34_a_ normalizes the speech of the calling party 12.

Either or both of the calling and called parties 12 and 14, respectively may pre-subscribe to speech normalization and have their speech normalized automatically, instead of invoking the service manually on a call-by-call basis as discussed above. A party, such as calling party 12 or/or called party 14, seeking to pre-subscribe to speech normalization may do so by either contacting a service representative of the IXC network. Alternatively, a party seeking to pre-subscribe to speech normalization may do so by dialing a telephone number, such as a toll free 800, 888 or 877 number, to reach the speech normalization platform associated with the toll switch "homed" or assigned to the subscribing party's LEC. Thus, to pre-subscribe to speech normalization, the calling party 12 dials the telephone number of the speech normalization platform 34_a_ associated with the toll switch 20 homed to the LEC 16 servicing the calling party.

Upon receipt of a call from a party seeking to subscribe to speech normalization, the speech normalization platform, such as platform 34_a_, acquires the telephone number of the party. The speech normalization platform 34 could acquire the telephone number either via Automatic Number Identification (ANI) assuming the corresponding switch, such as switch 20, possesses such capability, or by prompting the party for such information. Thereafter, the speech normalization platform 34_a_ prompts the subscribing party for a speech specimen, whereupon the platform then samples the speech to establish the various parameters from which to select the appropriate rule for the subscribing party. Thereafter, the speech normalization stores the rule, using the subscribing party's number or some other label associated with such a number, as the address for the rule. After a subscriber has subscribed, the segmentation directories, such as the segmentation directories 32_a_ and 32_b_, are updated from the information acquired by the speech normalization platforms 34_a_ and 34_b_ to reflect that the subscriber should enjoy speech normalization for calls originating from and dialed to the subscriber's number.

The IXC network 18 provides normalization in the following manner for subscribers that have pre-subscribed to the speech to normalization service. For each incoming telephone call, the switch receiving such a call, such as ingress switch 20, accesses its associated segmentation directory, such as segmentation directory 32_a_, to determine whether the calling party, and/or the called party has subscribed to speech normalization. As discussed above, the segmentation directory 32_a_ stores a list of phone numbers and an indication for each number whether the subscriber associated with that number has subscribed to any special services, such as speech normalization. Thus upon receipt at the switch 20 of a call from the calling party 12, the switch makes inquiry, typically via the SCP 28, to the segmentation directory 32_a_. In response to the number of the calling party and the dialed number of the called party, the segmentation directory 32_a_ provides an indication of the need for a special service, i.e., speech normalization. When calling party has pre-subscribed to speech normalization, the switch 20 receives such an indication and launches a request to the speech normalization platform 34_a_. When the called party has pre-subscribed to speech normalization, the switch 22 receives such an indication and launches a request to the speech normalization platform 34_b_. In response, the corresponding one of speech normalization platforms 34_a_ and 34*b*, respectively, provide the requested service. In this way, a party pre-subscribed for speech normalization can receive that service automatically for a call originated from, or dialed to that party.

The foregoing describes a technique for normalizing the speech of one or more parties to a telephone call carried by a telecommunications network.

The above-described embodiments merely illustrate the principles of the invention. Those skilled in the art may make various changes and variations that will embody the principles of the invention and fall within the spirit and scope thereof.

What is claimed is:

1. A method for normalizing the speech of at least one party to a telephone call carried by a telecommunications network comprising the steps of:

receiving in the network a command to invoke speech normalization of said one party's speech;

determining the manner in which said one party's speech should be normalized to enhance intelligibility by obtaining from said one party a speech specimen;

sampling said speech specimen to establish a set of speech parameters for said sample, said parameters including pitch, tone, cadence, frequency and amplitude;

identifying, from a set of speech normalization rules that specify how said one party's speech should be normalized, a rule that corresponds to said set of speech parameters and;

normalizing said one party's speech in the in accordance with the identified rule to enhance intelligibility.

2. The method according to claim 1 wherein the network receives the command in the form of a prescribed sequence of DTMF signals entered by said one party desirous of speech normalization.

3. The method according to claim 1 wherein the said one party originates the call.

4. The method according to claim 1 wherein said one party is a called party.

5. The method according to claim 1 wherein the command to invoke speech normalization is generated in response to a call originated by said one party.

6. The method according to claim 1 wherein the command to invoke speech normalization is generated in response to a call dialed to said one party.

7. The method according to claim 1 wherein the command received to invoke speech normalization comprises a prescribed sequence of DTMF signals manually entered by each party.

8. The method according to claim 1 wherein said normalizing step comprises the step of implementing said rule that corresponds to said set of speech parameters.

9. A method for normalizing the speech of each party to a telephone call carried by a telecommunications network comprising the steps of:

receiving in the network a command to invoke speech normalization of each party's speech;

determining the manner in which said each party's speech should be normalized to enhance intelligibility by obtaining from said each party a speech specimen;

sampling said speech specimen to establish a set of speech parameters for said sample, said parameters including pitch, tone, cadence, frequency and amplitude;

identifying, from a set of speech normalization rules that specify how said each party's speech should be normalized, a rule that corresponds to said set of speech parameters and;

normalizing each party's speech in the in accordance with the identified rule to enhance intelligibility.

10. The method according to claim 9 wherein the command to invoke speech normalization is generated in response to an indication that each party has pre-subscribed to speech normalization.

11. The method according to claim 10 wherein said indication is obtained by accessing a database containing telephone numbers of party' who have pre-subscribed to speech normalization to determine whether the party's number identifies the party as having pre-subscribed to speech normalization.

12. The method according to claim 9 wherein said normalizing step comprises the step of implementing said rule that corresponds to said set of speech parameters.

13. In a telecommunications network, apparatus for normalizing the speech of at least one party to a telephone call carried by said network, said apparatus comprising:

a processor for (1) obtaining from said one party a speech sample, (2) sampling said speech specimen to establish a set of speech parameters for said sample, said parameters including pitch, tone, cadence, frequency and amplitude, (3) identifying, from a set of speech normalization rules that specify how said each party's speech should be normalized, a rule that corresponds to said set of speech parameters, and (4) implementing said rule to modify said one party's speech to enhance intelligibility.

14. A telecommunications network comprising:

an ingress switch for receiving a telephone call from a calling party;

an egress switch coupled to said ingress switch for routing said telephone call to a called party;

a signaling network coupled to said ingress and egress switches for communicating signaling messages between them to facilitate call handling; and at least one speech normalization platform responsive to a command launched by one of said ingress and egress switches to normalize the speech of one of said calling and called parties in response speech normalization being invoked by said one of said calling and called parties, said platform normalizing the speech of said one calling party by (1) obtaining from said one party a speech sample, (2) sampling said speech specimen to establish a set of speech parameters for said sample, said parameters including pitch, tone, cadence, frequency and amplitude, (3) identifying, from the set of speech normalization rules that specify how said each party's speech should be normalized, a rule that corresponds to said set of speech parameters, and (4) implementing said rule to modify said one party's speech to enhance intelligibility.

* * * * *